US005678452A

United States Patent [19]

Frazier

[11] Patent Number: 5,678,452

[45] Date of Patent: Oct. 21, 1997

[54] GRINDER POWERED DEVICE FOR PULLING A CHAIN

[76] Inventor: Robert Joseph Frazier, 2062 Orchard St., Marquette, Mich. 49855

[21] Appl. No.: 540,459

[22] Filed: Oct. 10, 1995

[51] Int. Cl.$^{6}$ .................................................. F16H 27/00

[52] U.S. Cl. ........................ 74/89.21; 254/342; 254/362

[58] Field of Search ........................ 74/89.21; 254/219, 254/221, 342, 362, 382

[56] References Cited

U.S. PATENT DOCUMENTS

| | | | |
|---|---|---|---|
| 768,822 | 8/1904 | Schmick | 254/342 |
| 916,111 | 3/1909 | Cross | 254/342 |
| 1,572,001 | 2/1926 | Dotzert | 254/342 |
| 2,373,048 | 4/1945 | Parker et al. | 254/342 |
| 2,667,331 | 1/1954 | Robins | 254/342 |
| 2,881,626 | 4/1959 | Morris . | |
| 3,148,556 | 9/1964 | Gibbs et al. . | |
| 3,314,076 | 4/1967 | De Mare . | |
| 3,628,505 | 12/1971 | Myers | 254/362 |
| 3,645,153 | 2/1972 | Northcraft . | |
| 3,784,165 | 1/1974 | Pruitt | 254/342 |
| 3,862,672 | 1/1975 | Tappen et al. . | |
| 3,889,887 | 6/1975 | Wagstaff et al. . | |
| 5,022,249 | 6/1991 | Caporusso et al. . | |
| 5,263,688 | 11/1993 | Krueger | 74/89.21 |
| 5,269,059 | 12/1993 | Rozenbojm . | |
| 5,386,970 | 2/1995 | Trant | 254/362 |

FOREIGN PATENT DOCUMENTS

| | | |
|---|---|---|
| 59-65649 | 4/1984 | Japan . |
| 2 133 486 | 7/1984 | United Kingdom . |

*Primary Examiner*—Charles A. Marmor
*Assistant Examiner*—David M. Fenstermacher
*Attorney, Agent, or Firm*—Richard C. Litman

[57] ABSTRACT

An adaptor for allowing the pulling of a chain using a hand-held power tool. The adaptor has a gearbox housing a speed reduction gear train. An input shaft projects from the back of the gearbox and an output shaft projects from the front of the gearbox. The input shaft is adapted to be coupled to the output shaft of a hand-held power grinder. A sprocket specially designed to engage an ordinary oval link chain, is mounted on the output shaft. A sprocket housing having a movable cover is attached to the front of the gearbox. The sprocket housing has a movable cover which can be moved between an open and a closed position. The cover acts to maintain the chain in engagement with the sprocket when the chain is mounted to the sprocket and the cover is in the closed position, and the cover allows the chain to be removed from or mounted to the sprocket when the cover is in the open position.

7 Claims, 7 Drawing Sheets

GRINDER POWERED DEVICE FOR PULLING A CHAIN

BACKGROUND OF THE INVENTION

1. Field of the Invention

The present invention relates to an adaptor for allowing a hand-held power tool to be used in pulling a chain.

2. Description of the Prior Art

Ceiling mounted hoists are commonly used in foundries and metal working shops to lift heavy objects. This type of hoist is commonly referred to as a "chain-fall", and is operated by manually pulling a chain. Manually pulling a chain-fall chain is a laborious physical activity, and can potentially lead to physical injuries to iron workers. To alleviate some of the physical burden borne by iron workers and to reduce the risk of injury the present invention has been developed. The present invention allows a hand-held power tool, namely a power grinder, commonly found in foundries and metal working shops to be used for providing the power needed to pull the chain-fall chain. Although speed reduction gear mechanisms are known in the prior art, none of the prior art is seen to disclose the combination of a sprocket for engaging a chain provided at the output shaft of a gear box wherein the input shaft of the gear box is specially adapted for the attachment of the output shaft of a power grinder.

U.S. Pat. No. 2,881,626, issued to Morris, shows a variable speed, speed reducing gear mechanism adapted for attachment to a motor housing. Morris does not show the sprocket of the present invention, or an input shaft adapted for attachment to the output shaft of a power grinder.

U.S. Pat. No. 3,148,556, issued to Gibbs et al., shows a speed changing gear mechanism. Gibbs et al. do not show the sprocket of the present invention, or an input shaft adapted for attachment to the output shaft of a power grinder.

U.S. Pat. No. 3,314,076, issued to De Mare, shows a speed changing gear mechanism adapted for use in a strip-chart recorder. De Mare does not show the sprocket of the present invention, or an input shaft adapted for attachment to the output shaft of a power grinder.

U.S. Pat. No. 3,645,153, issued to Northcraft, shows an automotive differential having provision for quick changing of the drive ratio. Northcraft does not show the sprocket of the present invention, or an input shaft adapted for attachment to the output shaft of a power grinder.

U.S. Pat. No. 3,862,672, issued to Tappen et al., shows a gear drive unit for the axle of a drag racer. Tappen et al. do not show the sprocket of the present invention, or an input shaft adapted for attachment to the output shaft of a power grinder.

U.S. Pat. No. 3,889,887, issued to Wagstaff et al., shows an apparatus for controlling the operation of the cutting reel and the grinding mechanism of a harvester. Wagstaff et al. do not show the sprocket of the present invention, or an input shaft adapted for attachment to the output shaft of a power grinder.

U.S. Pat. No. 5,022,249, issued to Caporusso et al., shows a pipe bending machine with a gear box. Caporusso et al. do not show the sprocket of the present invention, or an input shaft adapted for attachment to the output shaft of a power grinder.

U.S. Pat. No. 5,269,059, issued to Rozenbojm, shows a gear train used in sheet metal presses for locking the press slide in a variety of positions. Rozenbojm does not show the sprocket of the present invention, or an input shaft adapted for attachment to the output shaft of a power grinder.

Japanese Patent Document Number 59-65649, by Shibazaki, shows a solenoid controlled gear mechanism for a copy machine. Shibazaki does not show the sprocket of the present invention, or an input shaft adapted for attachment to the output shaft of a power grinder.

United Kingdom Patent Document Number 2 133 486 A, by Grosse-Scharmann, shows a gear box for use in agricultural machines. Grosse-Scharmann does not show the sprocket of the present invention, or an input shaft adapted for attachment to the output shaft of a power grinder.

None of the above inventions and patents, taken either singly or in combination, is seen to describe the instant invention as claimed.

SUMMARY OF THE INVENTION

The present invention is directed to an adaptor for allowing the pulling of a chain using a hand-held power tool. The adaptor has a gearbox which houses a speed reduction gear train. An input shaft projects from the back of the gearbox and an output shaft projects from the front of the gearbox. The input shaft is adapted to be coupled to the output shaft of a hand-held power grinder. A sprocket specially designed to engage an ordinary oval link chain, is mounted on the output shaft. A sprocket housing having a movable cover is attached to the front of the gearbox. The sprocket housing has a movable cover which can be moved between an open and a closed position. The cover acts to maintain the chain in engagement with the sprocket when the chain is mounted to the sprocket and the cover is in the closed position, and the cover allows the chain to be removed from or mounted to the sprocket when the cover is in the open position. A safety bar prevents the uncontrolled spinning of the power tool in the event the power tool slips out of a user's hands.

Accordingly, it is a principal object of the invention to provide a device that allows a hand-held power tool to be used for pulling a chain.

It is another object of the invention to provide a device for pulling a chain made up of a series of identical links connected together.

It is a further object of the invention to provide a device for pulling a chain using a hand-held power tool, which allows the torque generated by the power tool to be amplified.

Still another object of the invention is to prevent uncontrolled spinning of a power tool used for pulling a chain, in the event the power tool slips out of the user's hands.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
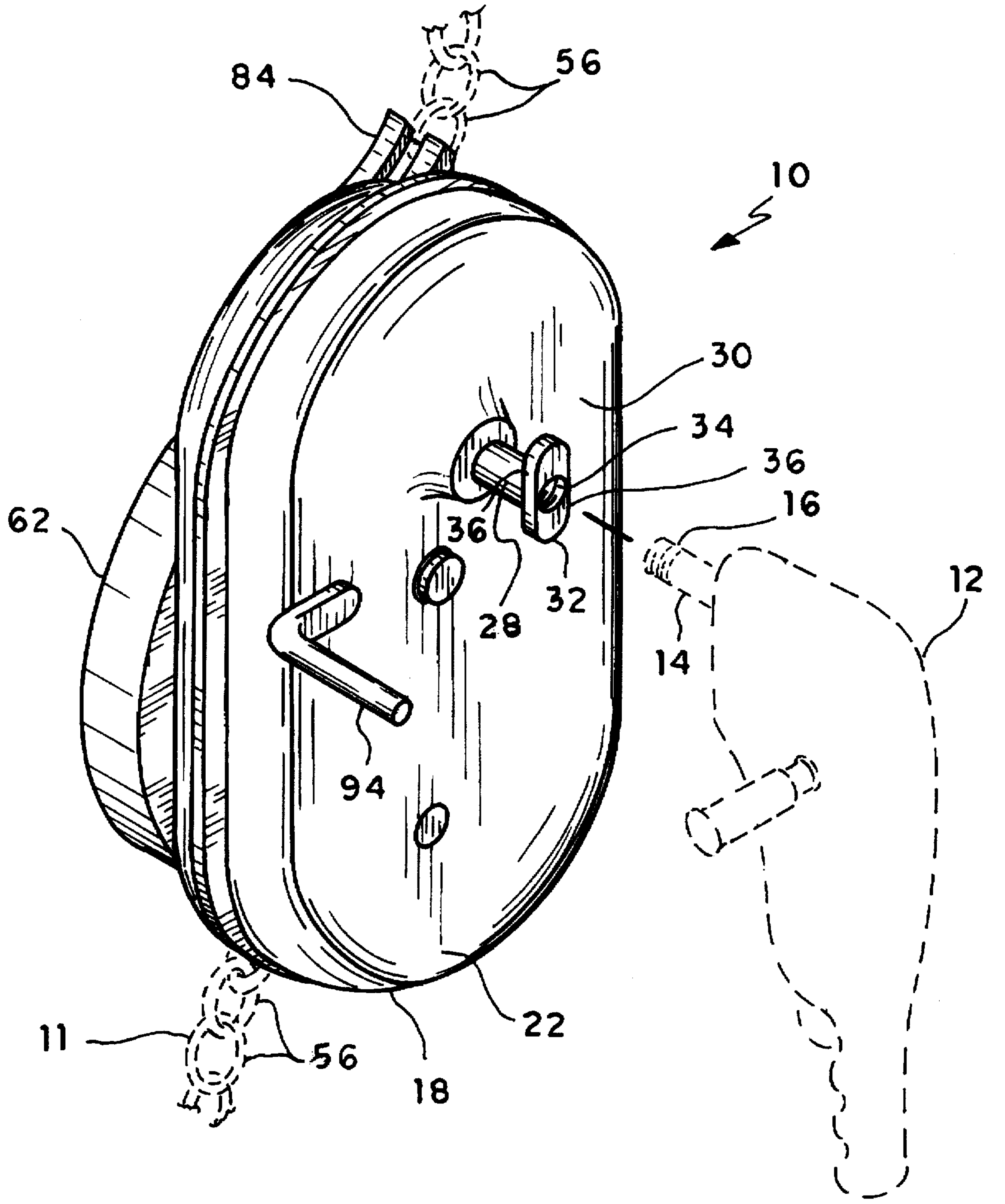
FIG. 1 is an environmental view of the device of the present invention for allowing the use of a hand-held power tool for pulling a chain.
Figure 2:
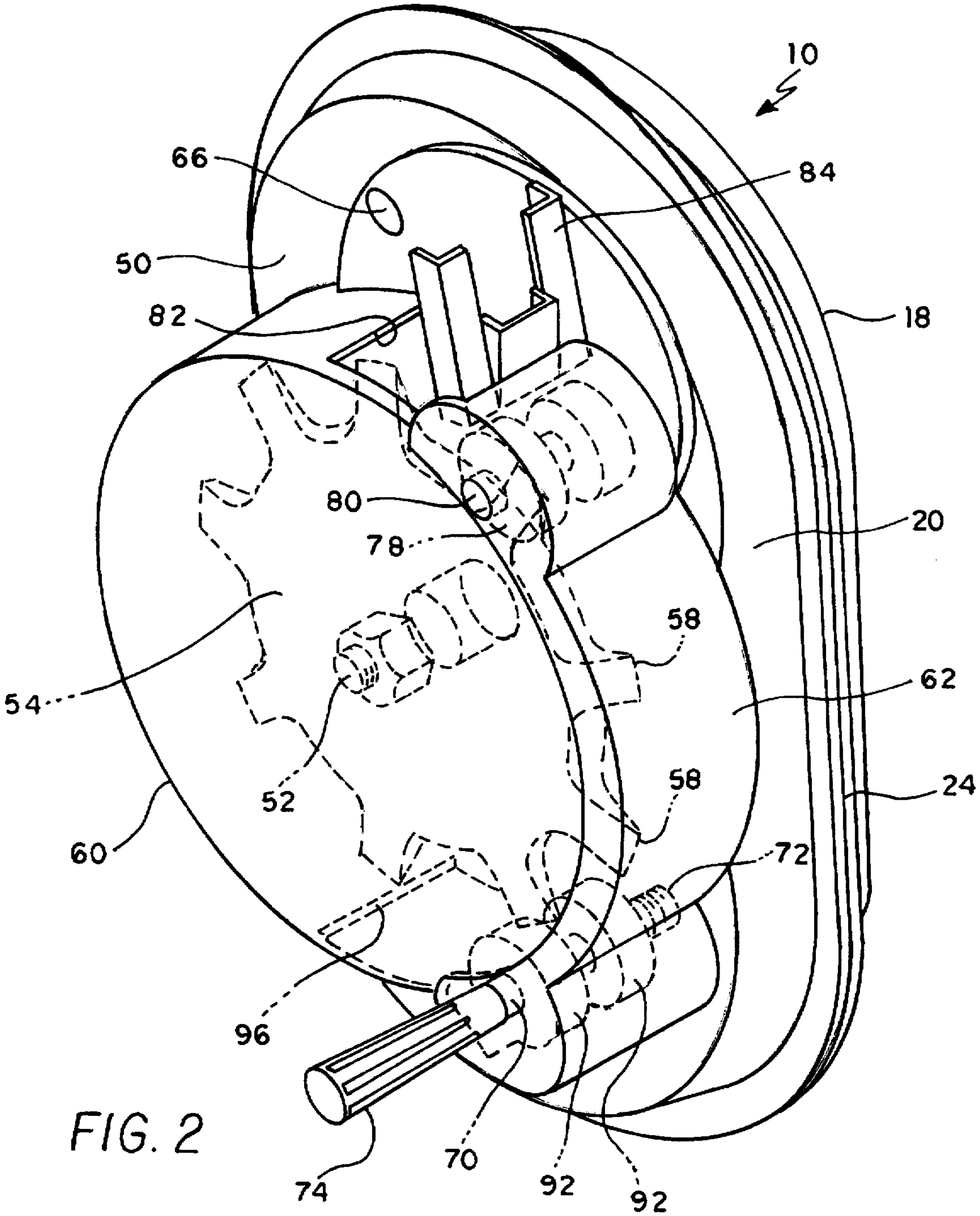
FIG. 2 is a front perspective view of the device of the present invention for allowing the use of a hand-held power tool for pulling a chain.
Figure 3:
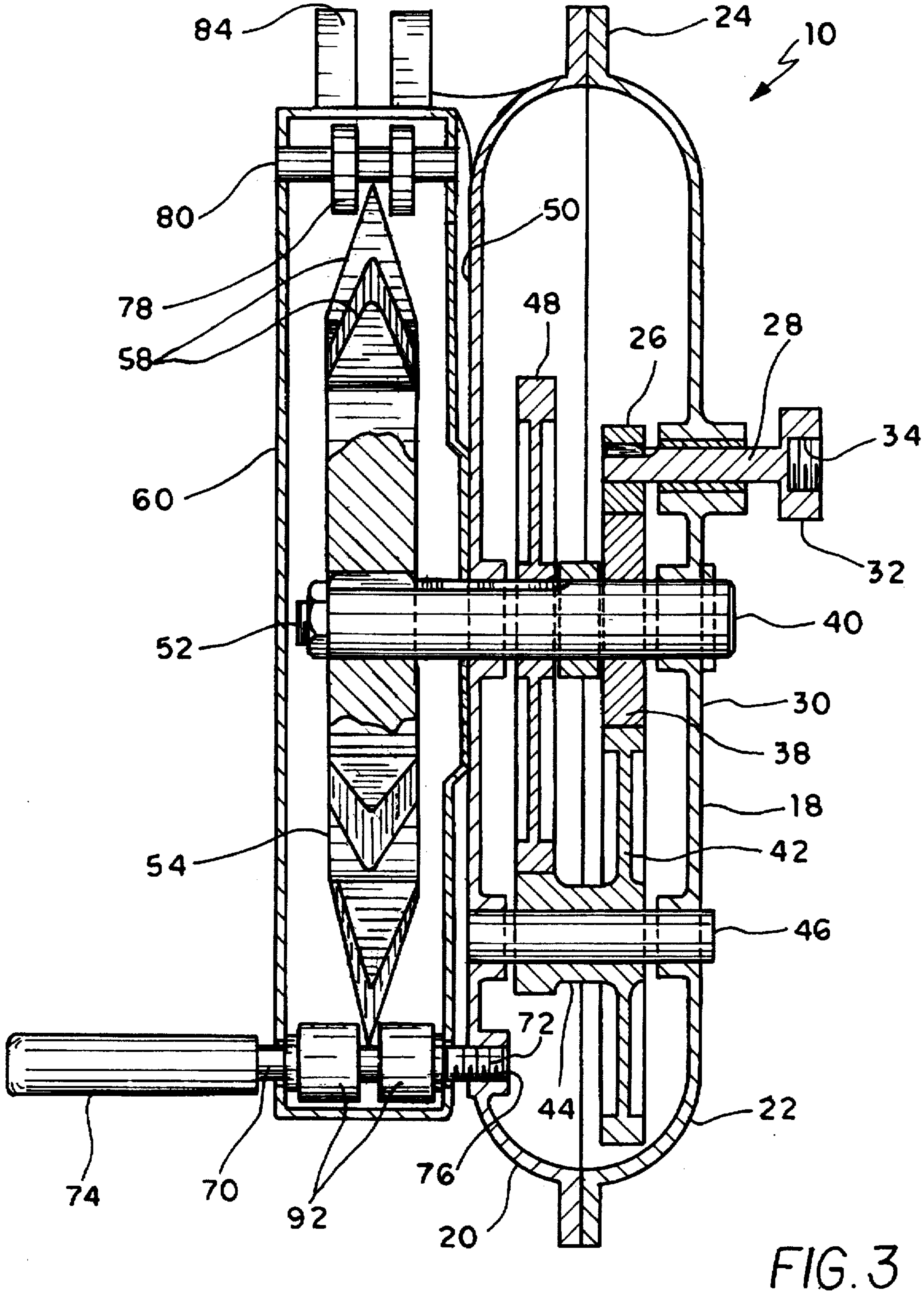
FIG. 3 is a cross sectional view of the device of the present invention showing the gear train housed within the gearbox.

Referring to the drawings, the present invention is an adaptor 10 for allowing the pulling of a chain 11 using a hand-held power tool 12. The power tool 12 is preferably a hand-held power grinder. The power tool 12 has a drive shaft 14 which has a threaded end 16. The adaptor 10 includes a gearbox 18 having a front half 20 and a rear half 22. The front and rear halves are joined together at the flange 24. The two halves of flange 24 can be spot welded together, held together by nuts and bolts, or riveted together.

The gearbox 18 houses a speed reduction gear train including a gear 26 keyed to an input shaft 28. Input shaft 28 projects from the rear face 30 of the gearbox 18. Input shaft 28 has a flange 32 at its outside end. In the center of flange 32 is a threaded hole 34 designed to matingly engage the threaded end 16 of the drive shaft 14 of the power tool 12. Flats 36 provided on the flange 32 allow the use of a wrench to tighten the shaft 28 onto the shaft 14 of power tool 12. Gear 26 is keyed to shaft 28 or matingly engages splines on shaft 28 such that rotation of shaft 28 causes rotation of gear 26.

The gear 26 is in mesh with idler gear 38 which is supported by and freely rotates about output shaft 40, i.e. gear 38 rotates independently of shaft 40. The gear 38 is in mesh with gear 42. Gear 42 shares a common hub with gear 44, thus gear 42 and gear 44 always rotate together. Both gear 42 and gear 44 rotate freely about support shaft 46. The gear 44 is in mesh with gear 48. Gear 48 is keyed to or otherwise fixed to output shaft 40 such that the two always rotate together. As should be apparent from the arrangement of the gears 26, 38, 42, 44 and 48, rotation of input shaft 28 will cause the rotation of the output shaft 40. Because the diameter of gear 38 is greater than that of gear 26, gear 38 will rotate at a rate lower than the rate of rotation of gear 26. Also, the diameter of gear 42 being greater than the diameter of gear 38, gear 42 will rotate at a rate lower than the rate of rotation of gear 38. Gear 44 will rotate at the same rate as gear 42. The diameter of gear 48 being greater than the diameter of gear 44, gear 48 will rotate at a rate lower than the rate of rotation of gear 44. Thus, overall the rate of rotation of shaft 40 will be lower than that of shaft 28. The gear train housed in gearbox 18 is therefore a speed reducing gear train. Using the speed reducing gear train, the torque produced by the power tool can be amplified thus allowing the power tool, in combination with the adaptor 10, to exert the necessary force for pulling of the chain 11.

Output shaft 40 projects from the front face 50 of the gear box 18. Fixedly attached to the outside end 52 of the shaft

40, so as to rotate therewith, is a sprocket 54. Unlike, for example, a bicycle sprocket which is designed to engage a special type of chain, the sprocket 54 is specially designed to engage the common, oval link chain 11. The chain 11, which the sprocket 54 is designed to engage, is formed by a series identical oval links 56 linked together to form chain 11. Each link 56 is formed of a rod of circular cross section bent into a substantially oval ring, thus each link has a substantially oval central opening through which adjacent links pass. This arrangement leads to adjacent links having the planes of their central openings being substantially perpendicular to one another, when the chain 11 is under tension. The teeth 58 of sprocket 54 project radially outward from the periphery of sprocket 54, and are evenly spaced around the sprocket's periphery. The teeth 58 of sprocket 54 engage respective links in chain 11 by passing through the respective links' oval central opening. Because the opening in every other link faces in a direction perpendicular to the openings in the intermediate links, the teeth 58 must be spaced apart such that successive teeth 58 engage every other link in the chain 11, when the chain is engaged by sprocket 54. Also, sufficient clearance (in terms of the peak to valley distance of the teeth) must exist between successive teeth to accommodate those links which are not engaged by the teeth 58, i.e. those links whose openings face in a direction perpendicular to the radial direction of the teeth 58.

Figure 5:
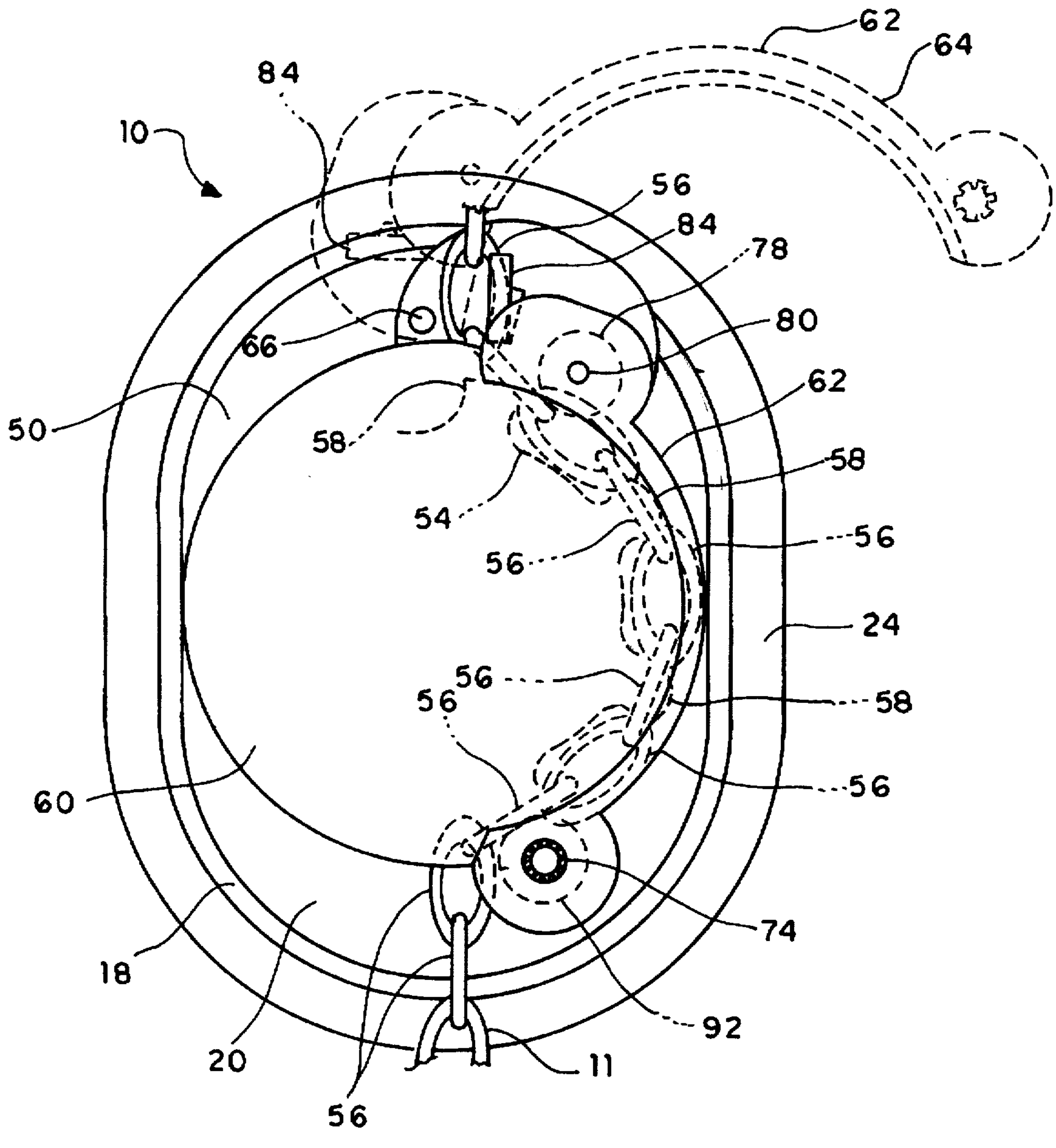
FIG. 5 is a front elevational view of the device of the present invention for allowing the use of a hand-held power tool for pulling a chain, showing the sprocket cover in open and closed positions.
Figure 6:
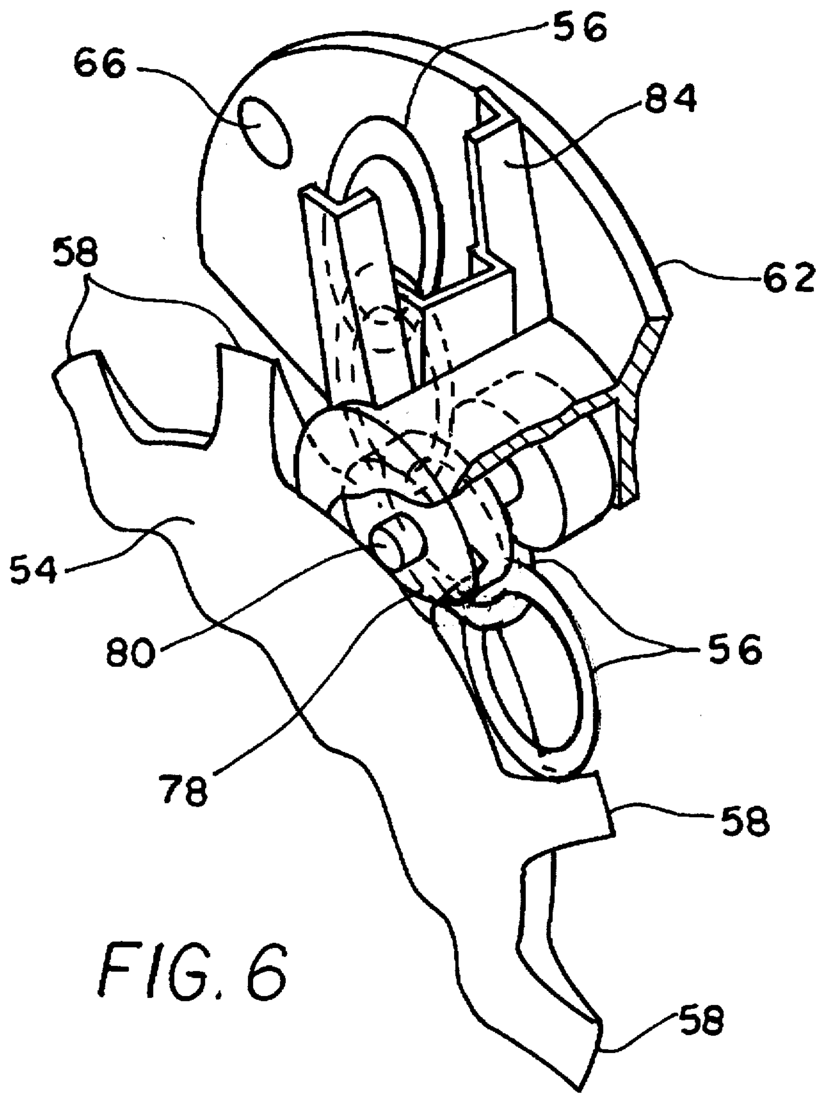
FIG. 6 is a fragmentary view showing the function of the guide roller and the guide extension.
Figure 7:
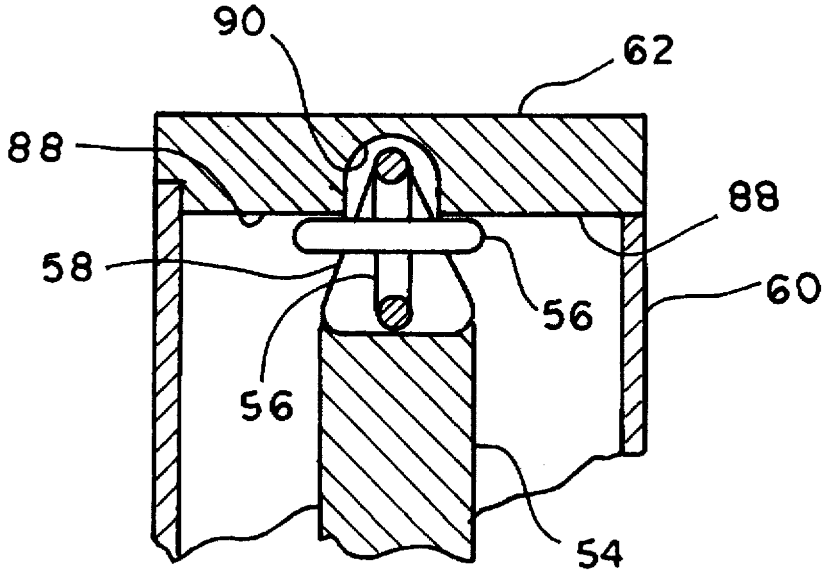
FIG. 7 is a fragmentary view showing the function of the guide track.

A sprocket housing 60 having a movable cover 62, is attached to the front of gearbox 18. The cover 62 is movable between an open and a closed position as shown in FIG. 5. In the closed position the cover 62 is positioned to maintain the chain 11 in engagement with the sprocket 54. In the open position the cover 62 allows the chain 11 to be removed from or mounted to the sprocket 54.

Figure 4:
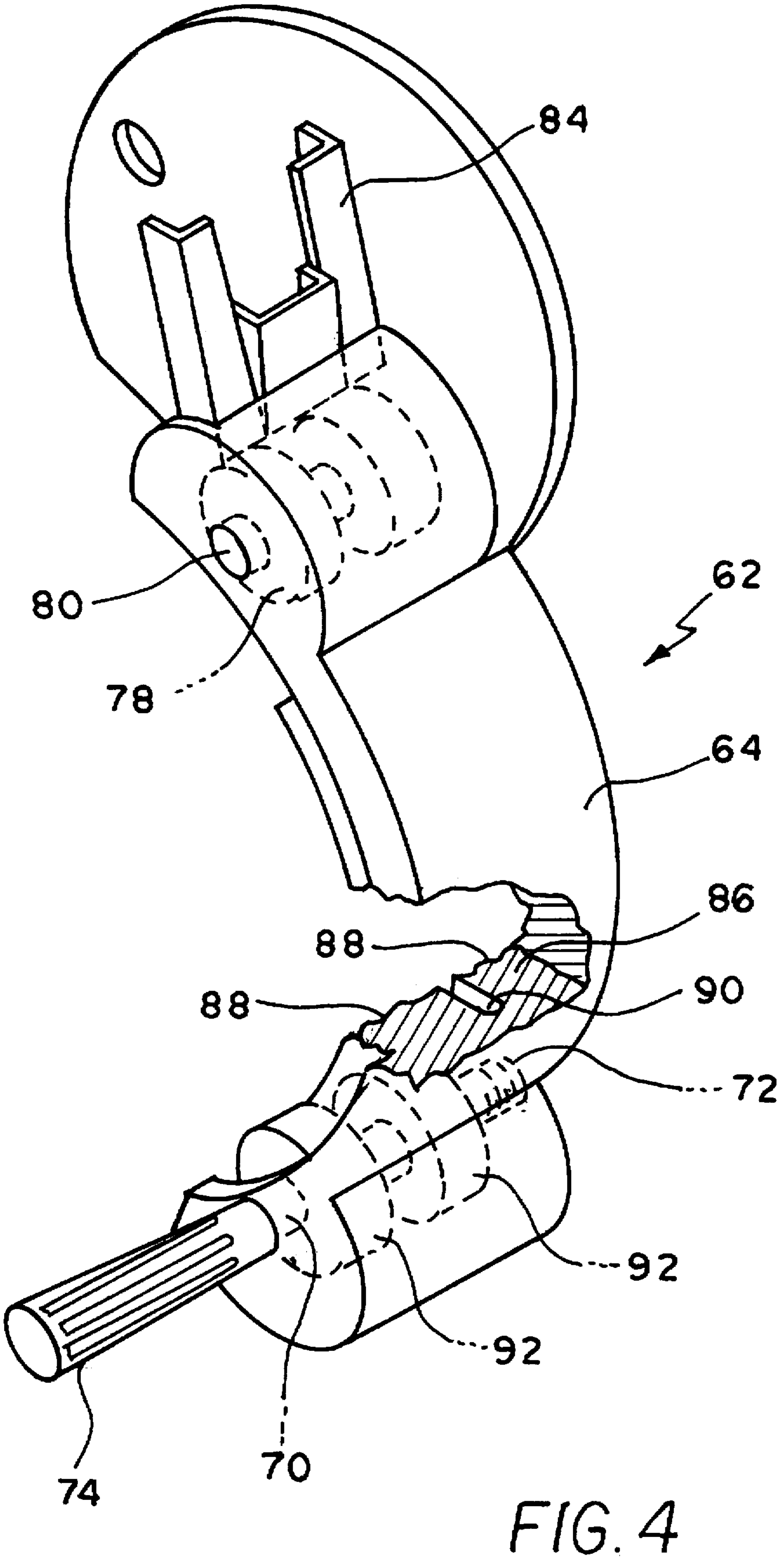
FIG. 4 is a fragmentary view showing the movable cover of the sprocket housing in isolation.

Referring to FIGS. 4 and 5, cover 62 includes a substantially semicircular wall 64 having a first end and a second end. The wall 64 forms part of the side wall of the cylindrical sprocket housing 60 when cover 62 is in the closed position. Also, the wall 64 lies substantially parallel to an arc defined by the tips of teeth 58 when the cover 62 is in the closed position. A pin 66 attached to the front of the gearbox 18 and passing through cover 62 proximate the first end of the wall 64, pivotably supports cover 62 allowing cover 62 to move by pivoting between the open and closed positions.

Near the second end of the wall 64, is a rod 70. The rod 70 has a threaded end 72 and a grasping end 74. Rod 70 passes through the entire width of the cover 62. A threaded hole 76, provided in the front face of gearbox 18, can be matingly engaged by the rod 70 to secure cover 62 in the closed position.

A guide roller 78 supported by a shaft 80 is attached to the cover 62 and is positioned to maintain the chain in engagement with the sprocket 54 when the chain is mounted to the sprocket and the cover is in the closed position. The guide roller 78 has a central groove, and is preferably positioned such that the roller presses on the links that have teeth 58 passing through them while the roller's central groove accommodates the links which do not have any sprocket teeth passing through them.

An opening 82 in the sprocket housing 60 acts as the inlet for chain 11. A guide extension 84 is attached to the cover 62 proximate the roller 78. Guide extension 84 lies adjacent the opening 82 to prevent the chain from getting snagged on the edge of opening 82 distal from the pin 66.

A guide track 86 extends along the inside surface of the wall 64. The guide track 86 is formed by two parallel lands 88 on either side of a central groove 90. The guide track 86 is positioned to maintain the chain in engagement with the sprocket 54 when the chain is mounted to the sprocket and the cover 62 is in the closed position. The lands 88 press on the links that have teeth 58 passing through them while the groove 90 accommodates the links which do not have any sprocket teeth passing through them, when cover 62 is in the closed position.

Rollers 92 prevent abrasion of rod 70 by the chain 11 during operation of the device. It should also be noted that any known method for fixing a sprocket or gear to a shaft, such that the sprocket or gear rotates with the shaft, can be used in the present invention and that the present invention is not limited to the specific methods for fixing a sprocket or gear to a shaft described herein.

Safety bar 94 can optionally be attached to the back of gearbox 18 to prevent uncontrolled spinning of power tool 12 in the event that the power tool slips out of the user's hand, or a sudden increase in the resistance to pulling of the chain causes the power tool to "kick back". Safety bar 94 can be attached to gearbox 18 by any well known means including welding, rivets, bolts, screws, etc.

In operation the power tool 12 is first fixed to input shaft 28 in the manner previously described. With cover 62 in the open position the top of sprocket 54 is exposed, and the guide extension 84 and roller 78 are moved sufficiently away from the sprocket 54 to allow chain 11 to pass between the roller 78 and the sprocket 54. Also, since the guide extension 84 in part defines opening 82, moving cover 62 to the open position converts opening 82 to a roughly U-shaped slot that is open on one side, thus allowing chain 11 to pass into opening 82 when the chain is mounted on the sprocket 54. Therefore, with cover 62 in the open position, the chain can be mounted to the sprocket 54. Moving the cover 62 to the closed position holds the chain 11 onto the sprocket 54 and brings rod 70 into alignment with threaded hole 76. The cover 62 can then be secured in place by screwing rod 70 into threaded hole 76. With cover 62 secured in the closed position, the chain will be securely held onto sprocket 54. The chain 11 passes out of sprocket housing 60 through the opening 96. The opening 96 is similar in structure to opening 82 and is defined in part by the second end of the wall 64. As with opening 82, moving cover 62 to the open position converts opening 96 to a roughly U-shaped slot that is open on one side, thus allowing chain 11 to pass into opening 96 when the chain is mounted on the sprocket 54. Now turning on the power tool 12 will cause the chain 11 to be pulled through the sprocket housing 60.

Figure 8:
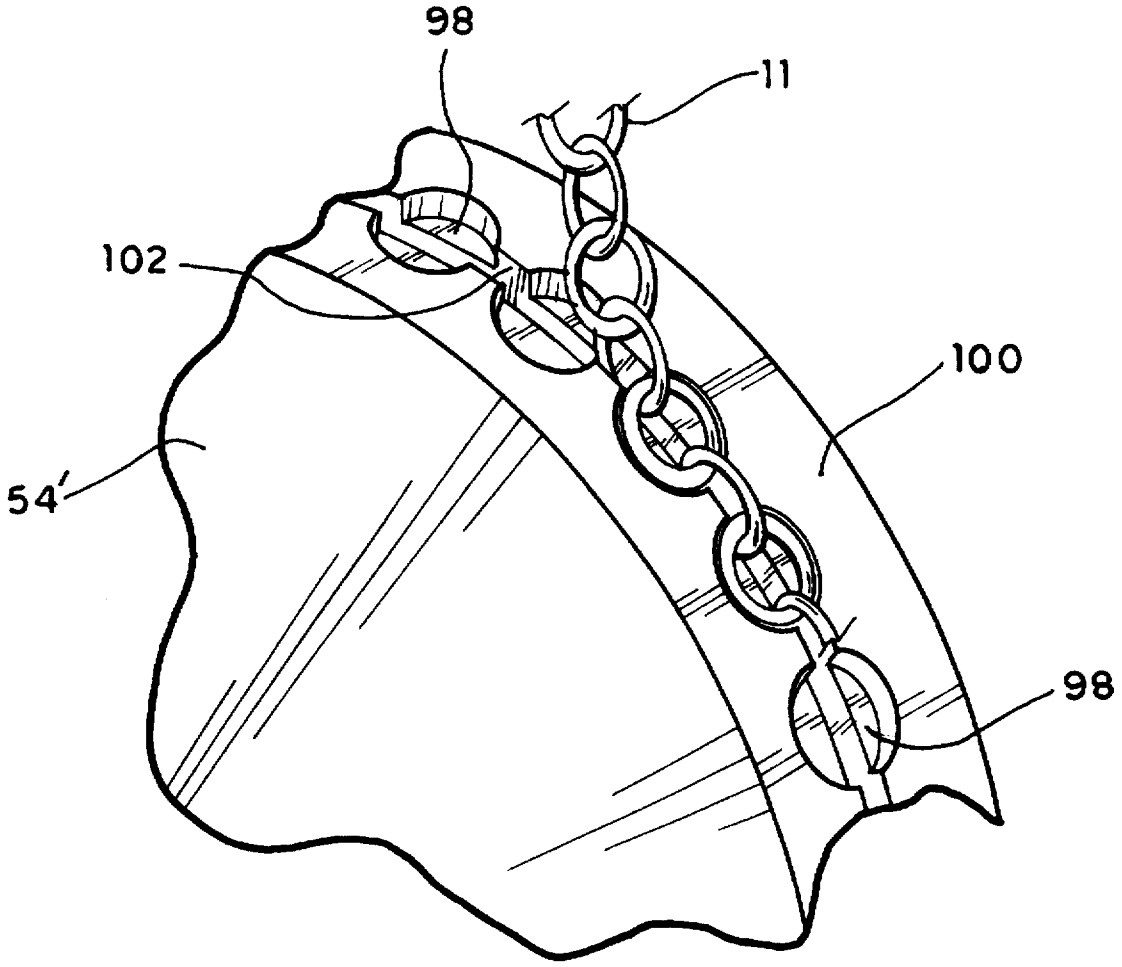
FIG. 8 is a fragmentary perspective view of an alternative, chain engaging sprocket design usable with the present invention.

Referring to FIG. 8, an alternative sprocket 54' for engaging chain 11 is seen. The sprocket 54' has no teeth. Instead, sprocket 54' has depressions 98 on its cylindrical outer surface 100, which accommodate every other link of the chain 11. Grooves 102, extending between depressions 98, accommodate chain links which do not lie flat within the depressions 98. Sprocket 54' can replace sprocket 54 in the adaptor 10, and would function in substantially the same manner as sprocket 54.

Although in the example described above, the input shaft 28 is adapted for attachment to the drive shaft of a power grinder, it should be apparent to those skilled in the art that the end of shaft 28, lying outside gearbox 18, can be modified to allow the use of any desired hand-held power tool. For example, the flange 32 and the threaded hole 34 can be eliminated, and the diameter of the outside end of shaft 28 can be selected so as to allow the shaft 28 to be engaged by the jaws of the chuck of a power drill.

It is to be understood that the present invention is not limited to the sole embodiment described above, but encompasses any and all embodiments within the scope of the following claims.

I claim:

1. An adaptor for allowing the pulling of a chain using a hand-held power tool having a drive shaft, said adaptor comprising:

a gearbox having a front face and a rear face;

a speed changing gear train housed in said gearbox;

an input shaft having a first end engageable with the drive shaft of the hand-held power tool, and a second end within said gearbox;

a first gear supported by said second end of said input shaft, said first gear in mesh with said speed changing gear train;

an output shaft having a first end extending outside said gearbox and an internal portion within said gearbox;

a second gear supported by said internal portion of said output shaft, said second gear being in mesh with said speed changing gear train, whereby turning said input shaft causes turning of said output shaft at a rate different from said input shaft;

a sprocket attached to said first end of said output shaft so as to rotate therewith, said sprocket engageable with a chain;

a sprocket housing having a cover pivotally attached to the front face of said gearbox, said cover pivotable between an open and a closed position; and a guide roller attached to said cover, said guide roller and said cover maintaining the chain in engagement with said sprocket when said cover is in the closed position, and said cover allowing removal and mounting of the chain when said cover is in the open position.

2. The adaptor according to claim 1, wherein said speed changing gear train is a speed reducing gear train, whereby turning said input shaft at a first rate causes turning of said output shaft at a second rate, said second rate being lower than said first rate.

3. The adaptor according to claim 1, wherein said front face of said gearbox has a threaded hole therein and said cover is secured in said closed position by a rod having a threaded end and a grasping end, said rod passing through said cover, and said threaded end of said rod matingly engaging said threaded hole.

4. The adaptor according to claim 1, wherein said sprocket housing has a slot formed therein, said slot forming an opening in cooperation with said cover for allowing the chain to pass into said sprocket housing when said cover is in said closed position, and said adaptor further includes a guide extension provided adjacent said opening to prevent the chain from getting snagged on an edge of said opening.

5. An adaptor for allowing the pulling of a chain using a hand-held power tool having a drive shaft, said adaptor comprising:

a gearbox having a front face and a rear face a speed reduction gear train housed in said gearbox;

an input shaft having a first end engageable with the drive shaft of the hand-held power tool, and a second end within said gearbox;

a first gear supported by said second end of said input shaft, said first gear in mesh with said speed changing gear train;

an output shaft having a first end extending outside said gearbox and an internal portion within said gearbox;

a second gear supported by said internal portion of said output shaft, said second gear being in mesh with said speed reduction gear train, whereby turning said input shaft causes turning of said output shaft at a rate lower than said input shaft;

a sprocket attached to said first end of said output shaft so as to rotate therewith, said sprocket engageable with a chain;

a sprocket housing having a substantially semicircular cover pivotable between an open and a closed position, said cover including an inside surface having a central groove therein defining a guide track for maintaining the chain in engagement with said sprocket when said cover is in the closed position.

6. The adaptor according to claim 5, wherein said front face of said gearbox has a threaded hole therein and said cover is secured in said closed position by a rod having a threaded end and a grasping end, said rod passing through said cover, and said threaded end of said rod matingly engaging said threaded hole.

7. The adaptor according to claim 5, wherein said sprocket housing has a slot formed therein, said slot forming an opening in cooperation with said cover for allowing the chain to pass into said sprocket housing when said cover is in said closed position, and said adaptor further includes a guide extension provided adjacent said opening to prevent the chain from getting snagged on an edge of said opening.

* * * * *